United States Patent [19]

Chapman et al.

[11] Patent Number: 5,695,843
[45] Date of Patent: Dec. 9, 1997

[54] MIXTURES OF SYMMETRICAL AND UNSYMMETRICAL NICKEL FORMAZAN DYES

[75] Inventors: Derek David Chapman, Rochester; Ramanuj Goswami, Webster, both of N.Y.

[73] Assignee: Eastman Kodak Company, Rochester, N.Y.

[21] Appl. No.: 722,903

[22] Filed: Sep. 27, 1996

[51] Int. Cl.⁶ .................................................. B32B 3/00
[52] U.S. Cl. .................... 428/64.1; 428/64.4; 428/64.8; 428/913; 430/270.14; 430/270.15; 430/270.16; 430/495.1; 430/945; 534/634
[58] Field of Search ....................... 428/64.1, 64.2, 428/64.4, 64.8, 913; 430/270.14, 270.15, 270.16, 495.1, 945; 534/634

[56] References Cited

U.S. PATENT DOCUMENTS

| 4,940,618 | 7/1990 | Hamada et al. | 428/64.1 |
| 5,090,009 | 2/1992 | Hamada et al. | 369/284 |
| 5,294,471 | 3/1994 | Evans et al. | 428/64 |
| 5,449,587 | 9/1995 | Itoh et al. | 430/273 |
| 5,547,728 | 8/1996 | Cunningham et al. | 428/64.1 |

*Primary Examiner*—Elizabeth Evans
*Attorney, Agent, or Firm*—John R. Everett

[57] ABSTRACT

A mixture of symmetrical and unsymmetrical nickel formazan dyes is disclosed. Optical recording elements containing the mixture are also disclosed.

5 Claims, No Drawings

MIXTURES OF SYMMETRICAL AND UNSYMMETRICAL NICKEL FORMAZAN DYES

FIELD OF THE INVENTION

The present invention relates dye mixtures and the use of such mixtures in optical recording elements.

BACKGROUND OF THE INVENTION

There are many types of known optical recording elements. In many of the elements, the mode of operation requires a recording layer having a high absorption and that the recorded areas, often referred to as pits, have low optical density or high reflection. The high reflection pits are made by ablating away the high absorption recording material, usually exposing an underlying reflective support.

One of the currently popular forms of optical storage of information is the compact disk or CD. Digital information is stored in the form of high optical density marks or pits on an otherwise reflective background, the exact opposite of the above described optical recording materials. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the optical density is higher than in those areas not having the deformations.

It is desirable to produce optical recording media which, when recorded in real time, produce a record that mimics the conventional CD on read out. Read out is at about 780 nm. In this manner, information can be added to the CD and the CD can be used on a conventional CD player.

One recently disclosed system of this type is the so called "Photo CD". In this system, conventional photographic film is first processed in a conventional manner. Then, the images from the film are digitized and the digital information is recorded in a CD readable form on an optical recording material. Images can then be played back on a CD type player into a conventional television. Since a CD has a capacity for a number of digitized images that is greater than the typical roll of consumer film, it is anticipated that the user will want to add images to a preexisting CD. Thus the need for recordable, CD compatible optical recording material.

One method for forming a recordable element that mimics conventional mold pressed CD elements is to provide a heat deformable support having thereon, in order, a layer of a dye that absorbs recording radiation and a reflective layer. Exposure of the recording layer through the support by the recording beam heats the recording layer to an extent that it is said that the surface of the heat deformable support just adjacent to the recording layer surface is deformed. Elements of this type are described in U.S. Pat. No. 4,940,618, European Patent Application 0,353,393 and Canadian Patent Application 2,005,520.

Commercially useful materials of the type described in these references have stringent requirements. The recording layer must be able to couple with incident laser irradiation to provide features having sufficient reflectivity. The layer must also have good stability towards light, heat and humidity for acceptable shelf life. Since the Photo CD is a consumer product, it must be capable of withstanding extreme environments. Between the time the original images are recorded on the Photo CD and the time subsequent images are recorded, the CD might be placed in strong sunlight.

In the U.S. and the European applications mentioned above, the preferred dyes for the recording layer are indodicarbocyanine dyes. However, this type of dye has less than the desired light stability and will in fact fade to an unusable state after only a few days of intense sunlight exposure.

In U.S. Pat. No. 5,547,728, optical recording layers for optical recording elements containing symmetrical nickel formazan dyes and cyanine dyes are disclosed. The formazans include those having the structure (I):

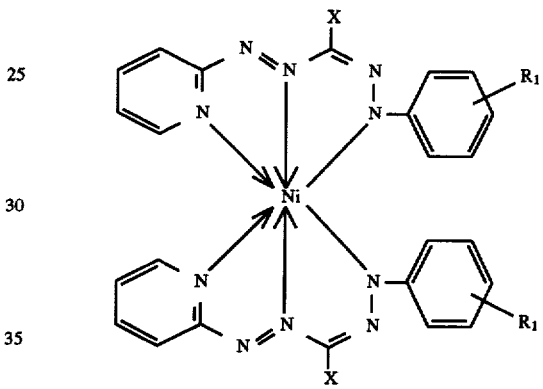

The symmetrical formazans stabilize the layers against fading in the presence of light. To be effective stabilizers the formazans need to be readily soluble in the solvents commonly used in spin coating such as 1-methoxy-2-propanol. Dye structural changes are known to have an impact on solubility. For example when X is an aliphatic chain the complexes usually have adequate solubility but the Tgs of the complexes are too low (see Table 1).

TABLE 1

| | X | $R_1$ | SOLUBILITY IN 1-METHOXY-2-PROPANOL G/100 mL | $T_g$ °C. |
|---|---|---|---|---|
| 1 | $CH(CH_3)_2$ | H | 4.2 | 59 |
| 2 | $CH(C_2H_5)C_4H_9$ | $NO_2$ | 10 | 64 |
| 3 | $CH(C_2H_5)C_4H_9$ | $CO_2C_2H_5$ | >5 | 30 |
| 4 | $CH(C_2H_5)C_4H_9$ | $SO_2N(CH_3)_2$ | 5 | 76 |

While the light stabilizing effect is still present in these soluble molecules, the wet oven stability is not sufficient (incubation of the element at 80° C. and 80% RH). All the compounds shown in Table 1 were coated as optical recording layers in combination with a cyanine dye CD-1:

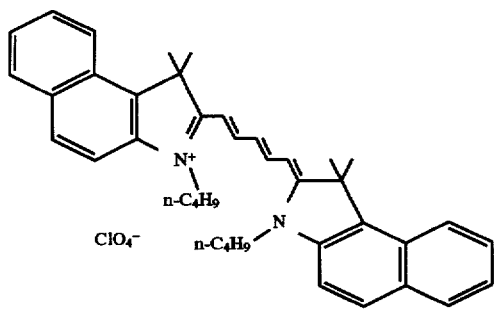

CD-1

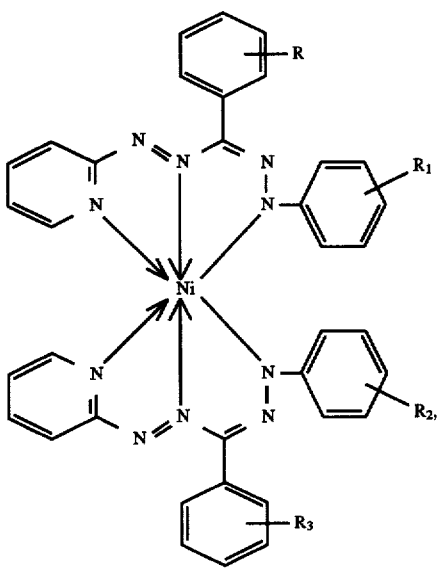

Optical recording elements were formed with the layers. After data were written on the elements they were subjected to incubation under the above conditions.

All elements failed established incubation stability criteria because of low Tgs. These criteria require that in such elements contrast (I11R) not by more than 0.05 after two weeks incubation, reflectivity not drop below 65%, symmetry not increase by more than 10 or decrease by more than −10 units, BLER (block error rate) not raise above 50.

In order to increase the Tgs above the incubation temperature and improve the wet oven stability it was found necessary for X to contain a phenyl ring. However the solubility of these molecules dropped considerably and was marginal as can be seen in Table 2.

One method for overcoming this solubility problem would be to use mixtures of formazan dyes. This is an expensive means to overcome the problem because two or possibly three formazans are needed to provide the appropriate dye concentration in the spin coating solution. Moreover symmetrical nickel formazans often crystallize out of coating solutions after sitting for about 1 week. Since they cannot be redissolved without difficulty, such solutions are practically worthless.

SUMMARY OF THE INVENTION

The present invention provides a mixture of symmetrical and unsymmetrical nickel formazan dyes wherein the dyes have the structure (I):

and the mixtures are selected from the group consisting of, A, B, C, D and E as follows:

| Table 2 compound | R | $R_1$ | $R_2$ | $R_3$ |
|---|---|---|---|---|
| A | | | | |
| 1 | 2-ethoxy | 4-methyl | 4-methyl | 2-ethoxy |
| 2 | 2-ethoxy | 4-isopropyl | 4-isopropyl | 2-ethoxy |
| 5 | 2-ethoxy | 4-methyl | 4-isopropyl | 2-ethoxy |
| B | | | | |
| 3 | 2-ethoxy | 3,4-dimethyl | 3,4-dimethyl | 2-ethoxy |
| 4 | 2-methyl | 3,4-dimethyl | 3,4-dimethyl | 2-methyl |
| 6 | 2-methyl | 3,4-dimethyl | 3,4-dimethyl | 2-ethoxy |
| C | | | | |
| 2 | 2-ethoxy | 4-isopropyl | 4-isopropyl | 2-ethoxy |
| 3 | 2-ethoxy | 3,4-dimethyl | 3,4-dimethyl | 2-ethoxy |
| 7 | 2-ethoxy | 3,4-dimethyl | 4-isopropyl | 2-ethoxy |
| D | | | | |
| 1 | 2-ethoxy | 4-methyl | 4-methyl | 2-ethoxy |
| 12 | 2-ethoxy | 4-secbutyl | 4-secbutyl | 2-ethoxy |
| 10 | 2-ethoxy | 4-methyl | 4-secbutyl | 2-ethoxy |
| E | | | | |
| 8 | H | 4-$SO_2N(CH_2CH_2)_2O$ | 4-$SO_2N(CH_2CH_2)_2O$ | H |
| 9 | 3-methyl | 4-$SO_2N(CH_2CH_2)_2O$ | 4-$SO_2N(CH_2CH_2)_2O$ | 3-methyl |
| 13 | H | 4-$SO_2N(CH_2CH_2)_2O$ | 4-$SO_2N(CH_2CH_2)_2O$ | 3-methyl |

These mixtures of formazans have a much greater solubility than either of the symmetrical formazans by themselves. As a result these mixtures provide good light stability to optical recording layers and elements.

To maintain good incubation stability the mixtures must have Tgs≧100° C. The mixtures of the invention meet this criteria. Thus they also provide excellent incubation stability to optical recording layers and elements.

Moreover the mixture does not crystallize out of coating solvents. Thus coating solutions can be prepared in advance, thereby making coating operations more efficient.

The present invention also provides an optical recording element having a transparent substrate and on the surface of said substrate, a recording layer comprising a cyanine dye and a nickel formazan dye mixture according to the invention, and a light reflecting layer, wherein the unrecorded recording layer is such that the real part of the refractive index (n) is not less than 1.8, and the imaginary part (k) is from 0.15 and 0.01.

DETAILS OF THE INVENTION

The nickel formazans of the above mentioned prior art are symmetrical 2:1 dye/nickel compounds which are synthesized by the following scheme:

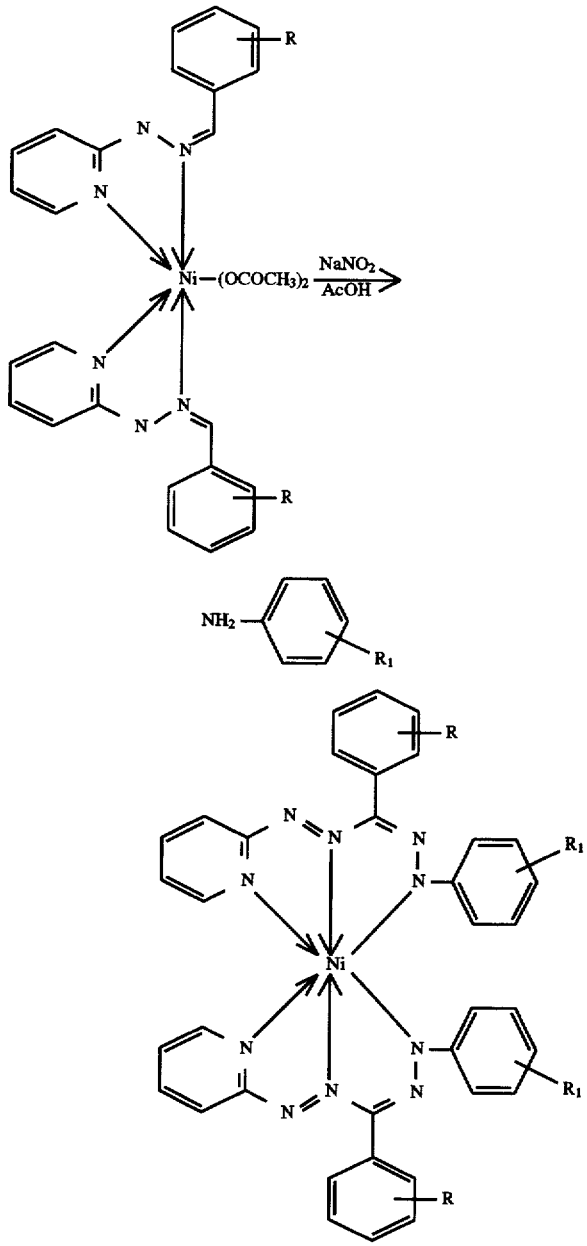

It is not possible to make an unsymmetrical complex by this synthetic scheme. However we have discovered that by using a mixture of amines in the diazotization step, a mixture of three formazans in the approximate ratio of 1:2:1 is formed. The unsymmetrical formazan can comprise from 40 to 60 mole percent of the mixture.

Mixtures were also prepared by starting with a mixture of hydrazones and coupling with a single diazotized amine. The results containing both types of unsymmetrical formazans are incorporated in Table 2.

These mixtures of formazans had much greater solubilities than either of the symmetrical formazan components of the mixtures by themselves.

The following examples demonstrate the preparation, solubility and Tgs of the mixtures of the invention.

EXAMPLE 1

Synthesis of the Formazan Mixture E (Compounds of 8,9 and 13 of Table 2).

Benzaldehyde-2-pyridylhydrazone (1.97 g) and 3-tolualdehyde-2-pyridylhydrazone (2.11 g) were added to a solution of nickel acetate (2.5 g) in dimethylformamide (20 ml). After stirring for 10 minutes, acetic acid (20 ml) was added followed by 4-morpholinosulfonylaniline (5 g).

The mixture was cooled to 5° C. and sodium nitrite (1.5 g) added in portions over 30 minutes and then allowed to warm to room temperature. After stirring overnight, water (30 ml) was added and the product filtered off. It was washed with methanol/water 1:1 until the washings were clear and then given a methanol wash. After drying in the oven the product was purified by dissolution in acetone (200 ml), filtration to remove a trace of insoluble material and then diluted with methanol (300 ml). Filtration gave the product which weighed 5.7 g after drying. The presence of the three components was confirmed by HPLC and mass spectral analysis.

EXAMPLE 2

Synthesis of the Formazan Mixture A (Compounds of 1, 5 and 2 of Table 2).

A mixture of the 2-pyridylhydrazone of 2-ethoxybenzaldehyde (10.0 g), nickel acetate (5.16 g), 4-methylaniline (2.22 g) and 4-isopropylaniline (2.80 g) in dimethylformamide (200 ml) and acetic acid (200 ml) was stirred for 10 minutes. The mixture was cooled to 5° C. and sodium nitrite (2.90 g) solution in water (10 ml) was added in portions over 15 minutes and then allowed to warm to room temperature. After stirring overnight, water (400 ml) was added and the product filtered off. It was washed with methanol/water 1:1 until the washings were clear and then given a methanol wash. After drying in the oven the product was purified by dissolution in acetone, filtration to remove a trace of insoluble material and then diluted with methanol. Filtration gave the product which weighed 6.2 g after drying. The presence of the three major components 1, 5 and 2 (shown below, in the approximate ratio of 1:2:1, respectively) was confirmed by HPLC and mass spectral analysis.

1
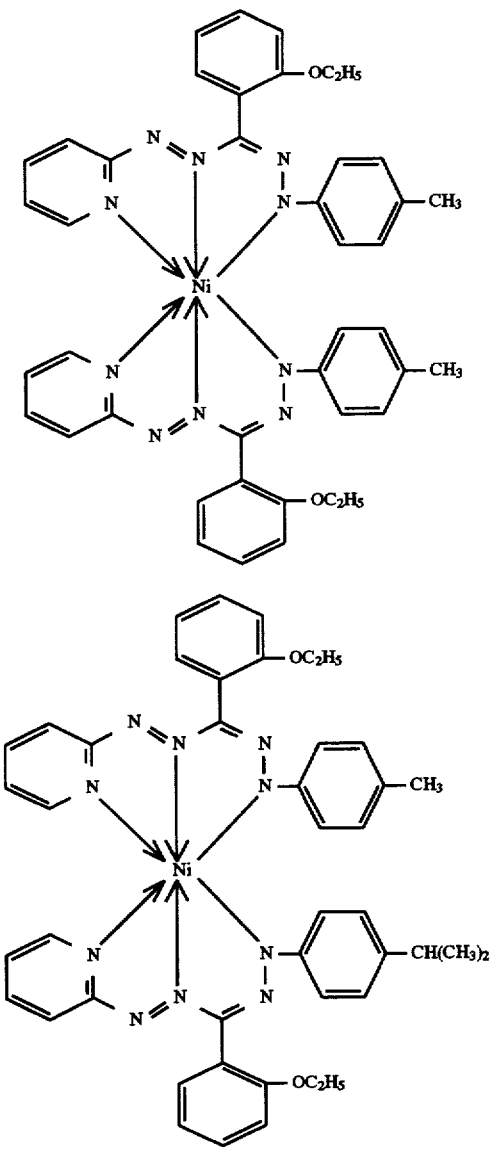
2
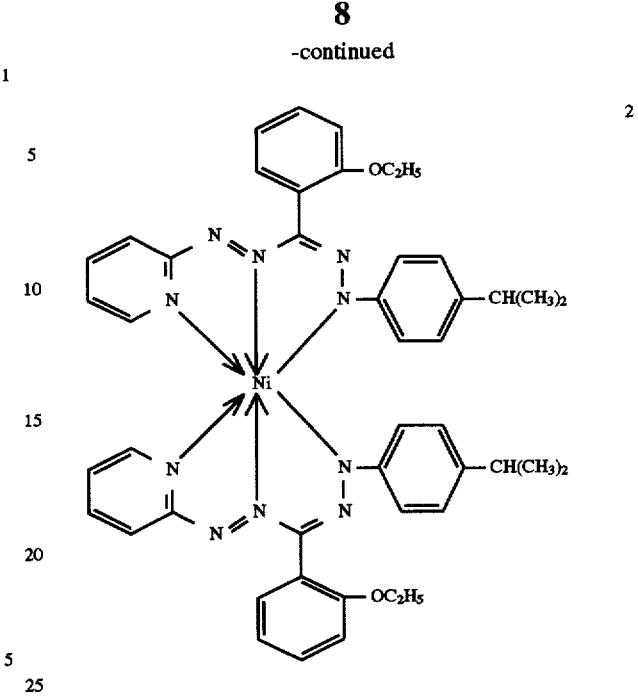
In Table 2 the solubilities, in grams/100 mL of 1-methoxy-2-propanol, of several nickel formazan compounds 1–4, 8–9 and 11–12 is given. A comparison of the latter solubilities with those of the mixtures of the invention show that the mixtures have much enhanced solubilities.
The general structure of the nickel formazan dyes in the table and mixtures is shown in structure I:

TABLE 2

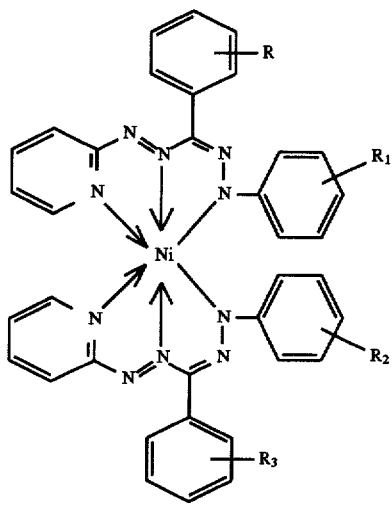

I

| Compound No. | R | $R_1$ | $R_2$ | $R_3$ | SOLUBILITY IN 1-METHOXY-2-PROPANOL | SOLUBILITY OF MIXTURE OF THE 3 FORMAZANS |
|---|---|---|---|---|---|---|
| 1 | 2-ETHOXY | 4-METHYL | 4-METHYL | 2-ETHOXY | 0.7 | |
| 2 | 2-ETHOXY | 4-ISOPROPYL | 4-ISOPROPYL | 2-ETHOXY | 0.6 | |
| 3 | 2-ETHOXY | 3,4-DIMETHYL | 3,4-DIMETHYL | 2-ETHOXY | 0.93 | |
| 4 | 2-METHYL | 3,4-DIMETHYL | 3,4-DIMETHYL | 2-METHYL | 1.0 | |
| 5 | 2-ETHOXY | 4-METHYL | 4-ISOPROPYL | 2-ETHOXY | | Mixture A: 1,2,5 >5 $T_g$ 106° |
| 6 | 2-METHYL | 3,4-DIMETHYL | 3,4-DIMETHYL | 2-ETHOXY | | Mixture B: 3,4,6 >5 $T_g$ 114° |
| 7 | 2-ETHOXY | 3,4-DIMETHYL | 4-ISOPROPYL | 2-ETHOXY | | Mixture C: 2,3,7 >5 $T_g$ 110° |
| 8 | H | 4-$SO_2N(CH_2CH_2)_2O$ | 4-$SO_2N(CH_2CH_2)_2O$ | H | 1.0 | |
| 9 | 3-METHYL | 4-$SO_2N(CH_2CH_2)_2O$ | 4-$SO_2N(CH_2CH_2)_2O$ | 3-METHYL | 1.07 | |
| 10 | 2-ETHOXY | 4-METHYL | 4-SECBUTYL | 2-ETHOXY | | Mixture D: 1,12,10 >5 $T_g$ 105° |
| 11 | 2-ETHOXY | 4-ETHYL | 4-ETHYL | 2-ETHOXY | 0.5 | |
| 12 | 2-ETHOXY | 4-SECBUTYL | 4-SECBUTYL | 2-ETHOXY | 0.6 | |
| 13 | H | 4-$SO_2N(CH_2CH_2)_2O$ | 4-$SO_2N(CH_2CH_2)_2O$ | 3-METHYL | | Mixture E: 8,9,13 >5 $T_g$ 165° |

This solubility enhancement is not completely general. One or two examples have been observed where, when one of the symmetrical complexes is exceedingly insoluble, the mixture of the three dyes shows only a modest increase in solubility.

Optical Recording Elements

The nickel formazan mixtures of the invention are mixed with cyanine dyes to form optical recording layers. The layers are used to form optical recording elements. Any cyanine dye should be useful as long as the mixture has the refractive index attributes specified in the summary of the invention. Thus the cyanine dye component may itself be a mixture of two or more cyanine dyes. Indodicarbocyanine dyes are particularly useful. Useful mixtures of cyanine dyes have been formed with the dye CD-1 described under the Background, supra, and cyanines dyes.

Useful cyanine dyes mixtures can be formed from symmetrical cyanine dyes according to structure II and unsymmetrical cyanine dyes according to structure III:

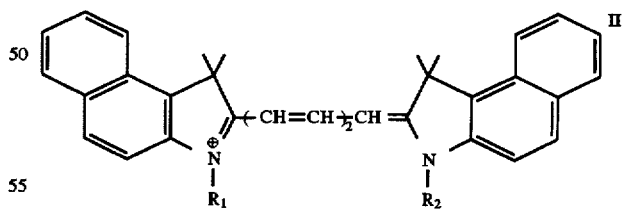

II

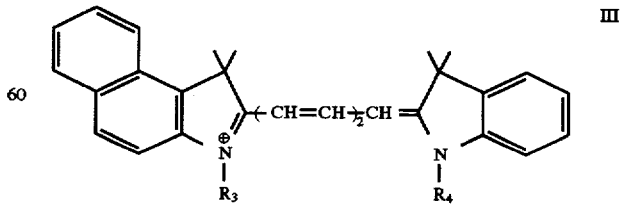

III wherein:

$R_1$, $R_2$, $R_3$ and $R_4$ represents substituted and unsubstituted alkyl of 1–12 carbon atoms, wherein substituents are selected from the group consisting of hydroxy, acyloxy, alkoxy, aryloxy, alkylthio, arylthio, alkylsulfonyl, arylsulfonyl, thiocyano, cyano, nitro, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, sulfo, trihalomethyl, alkyl, aryl, hetaryl, alkylureido, arylureido, succinimido and phthalimido.

Examples of symmetrical dyes include CD-1 described under the background of the invention and CD-2, CD-7, and CD-118.

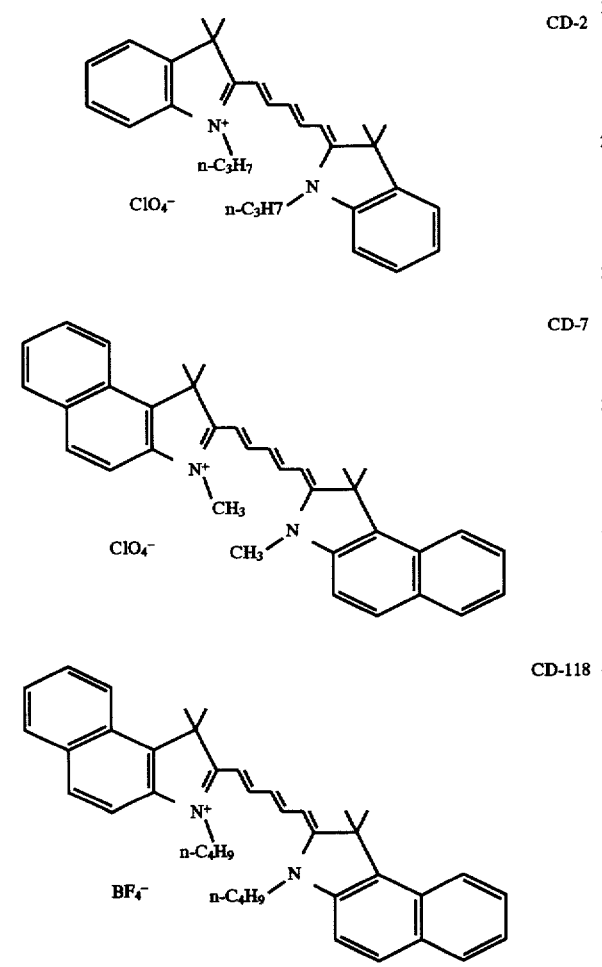

CD-2

CD-7

CD-118

Examples of unsymmetrical cyanine dyes have the structure

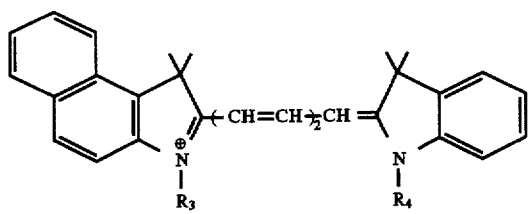

Table 3 specifies some of the possible definition of $R_3$ and $R_4$.

TABLE 3

| $R_3$ | $R_4$ |
|---|---|
| n-$C_4H_9$ | —$CH_3$ |
| n-$C_4H_9$ | n-$C_3H_7$ |
| n-$C_4H_9$ | n-$C_4H_9$ |

The optical elements of the invention comprise a light transmitting, typically pregrooved substrate, a dye containing optical recording layer overlaying the substrate, a light reflective layer overlaying the light absorptive layer and a protective layer overlaying the light reflective layer. The recording process will produce marks of lower reflectivity than the unmarked areas of the disk when written and read with a diode laser emitting between 770 and 800 nm. It is preferred that the substituents on the dye molecule be selected so that the real part of the complex refractive index (n) of the unwritten light absorptive layer measured with 780 nm light source is not less than 1.8 and the imaginary part (k) is from 0.15 to 0.01.

The substrate may be any transparent material that satisfies the mechanical and optical requirements. The substrates are generally pregrooved with groove depths from 20 nm to 250 nm, groove widths 0.2 to 1 µm and a pitch 1 to 2 mm. The preferred material is polycarbonate, other materials are glass, polymethylmethacrylate and other suitable polymeric materials.

The preparation of the optical recording element of the invention is achieved by spin coating of the metallized formazan dye mixture with a cyanine dye, cyanine dye mixture, and possibly other from a suitable solvent onto a transparent substrate. For coating, the metallized formazan dye with or without addenda is dissolved in a suitable solvent so that the dye is 20 or less parts by weight to 100 parts of solvent by volume. The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include alcohols, hydrocarbon halides, cellosolves, ketones. Examples of solvents are 2,2,3,3-tetrafluoropropanol, tetrachloroethane, dichloromethane, methyl cellosolve, ethyl cellosolve, 1-methoxy-2-propanol, 4-hydroxy-4-methyl-2-pentanone. Preferred solvents are alcohols since they have the least effect on the preferred polycarbonate substrates. Mixtures containing these solvents can also be used.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminum and copper and alloys thereof.

The protective layer over the reflective layer is similarly conventional for this art. Useful materials include UV curable acrylates.

One preferred protective layer is disclosed in commonly assigned U.S. patent application Ser. No. 815,020, filed Dec. 27, 1991 in the names of Kosinski and Amell. This application discloses a two layer structure in which the layer adjacent to the reflective layer is spin coated and the a second layer is screen printed.

An intermediate layer, to protect the metal layer from oxidation, can also be present.

The element of the invention can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

This invention has been described with particular reference to preferred embodiments thereof but it will be understood that modifications can be made within the spirit and scope of the invention.

We claim:

1. A mixture of symmetrical and unsymmetrical nickel formazan dyes wherein the dyes have the structure (I):

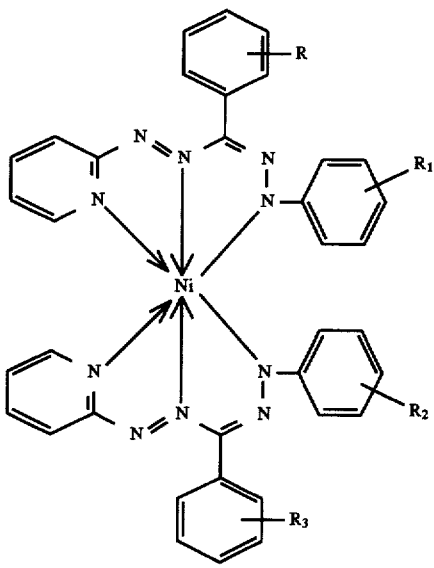

and the mixtures are selected from the group consisting of, A, B, C, D and E as follows:

| Table 2 compound | R | $R_2$ | $R_3$ | |
|---|---|---|---|---|
| A | | | | |
| 1 | 2-ethoxy | 4-methyl | 4-methyl | 2-ethoxy |
| 2 | 2-ethoxy | 4-isopropyl | 4-isopropyl | 2-ethoxy |
| 5 | 2-ethoxy | 4-methyl | 4-isopropyl | 2-ethoxy |
| B | | | | |
| 3 | 2-methyl | 3,4-dimethyl | 3,4-dimethyl | 2-ethoxy |
| 4 | 2-methyl | 3,4-dimethyl | 3,4-dimethyl | 2-methyl |
| 6 | 2-methyl | 3,4-dimethyl | 3,4-dimethyl | 2-ethoxy |
| C | | | | |
| 2 | 2-ethoxy | 4-isopropyl | 4-isopropyl | 2-ethoxy |
| 3 | 2-ethoxy | 3,4-dimethyl | 3,4-dimethyl | 2-ethoxy |
| 7 | 2-ethoxy | 3,4-dimethyl | 4-isopropyl | 2-ethoxy |
| D | | | | |
| 1 | 2-ethoxy | 4-methyl | 4-methyl | 2-ethoxy |
| 12 | 2-ethoxy | 4-secbutyl | 4-secbutyl | 2-ethoxy |
| 10 | 2-ethoxy | 4-methyl | 4-secbutyl | 2-ethoxy |
| E | | | | |
| 8 | H | 4-$SO_2N(CH_2CH_2)_2O$ | 4-$SO_2N(CH_2CH_2)_2O$ | H |
| 9 | 3-methyl | 4-$SO_2N(CH_2CH_2)_2O$ | 4-$SO_2N(CH_2CH_2)_2O$ | 3-methyl |
| 13 | H | 4-$SO_2N(CH_2CH_2)_2O$ | 4-$SO_2N(CH_2CH_2)_2O$ | 3-methyl |

2. A mixture according to claim 1 also comprising a dye selected from the group consisting of cyanine dyes.

3. A mixture according to claim 1 or 2 which also comprises a coating solvent is selected from the group consisting of 1-methoxy-2-propanol, ethyl cellosolve and mixtures containing these solvents.

4. A mixture according to claim 1 wherein the unsymmetrical nickel formazan dye forms from 40 to 60 mole percent of the mixture.

5. An optical recording element having a transparent substrate and on the surface of said substrate, a recording layer comprising a cyanine dye and a nickel formazan dye mixture according to claim 2, and a light reflecting layer, wherein the unrecorded recording layer is such that the real part of the refractive index (n) is not less than 1.8, and the imaginary part (k) is from 0.15 and 0.01.

* * * * *